455-296 SR
FIP8106 XR 2,501,327
SS REFERENCE
SEARCH ROOM
TK-1747
[redacted]
X5432E
2

March 21, 1950 L. H. GOOD 2,501,327

NOISE OPERATED AUTOMATIC VOLUME CONTROL

Filed Dec. 6, 1946

Inventor

Lowell H. Good

By

C. D. Tuska

Attorney

2501327
OR IN 179/1P

Patented Mar. 21, 1950 2,501,327

UNITED STATES PATENT OFFICE 2,501,327

NOISE OPERATED AUTOMATIC VOLUME CONTROL

Lowell H. Good, Riverton, N. J., assignor to Radio Corporation of America, a corporation of Delaware Application December 6, 1946, Serial No. 714,473

5 Claims. (Cl. 179—1)

Figure 1:
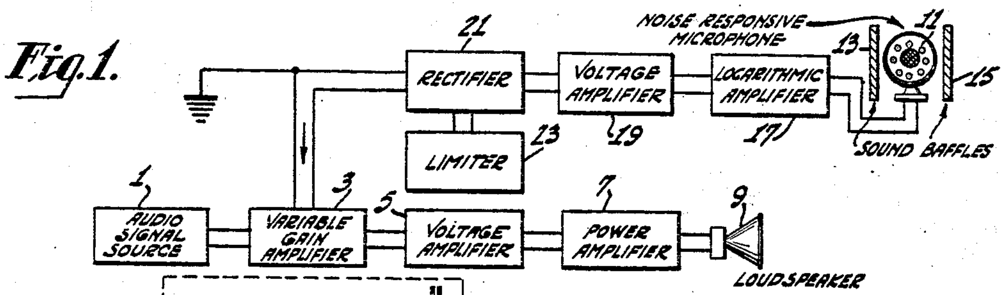

This invention relates to a noise operated automatic control for controlling the output volume from one or more loudspeakers in accordance with the noise level in the vicinity of the speakers. The output level of the apparatus is set to operate at a predetermined level above the level of the ambient noise and, by means of the automatic control arrangements, as the noise level varies the output volume varies similarly.

The invention is of primary use in theatres, restaurants, auditoriums or other similar places, where variations in the number of persons listening to the sound varies from time to time or where other conditions cause a variation in the ambient noise level such as in manufacturing plants and other similar places.

A noise operated automatic volume control similar to that described in the present invention is described and claimed in U. S. Patent No. 2,338,551, issued January 4, 1944, to Edward Stanko. While the arrangement described in the patent operates to control the level of the sound produced by one or more loudspeakers in accordance with the ambient noise level, it has been found that a more satisfactory control can be obtained where the power output to the loudspeaker measured in decibels, is caused to vary linearly and in direct proportion with respect to the power level in decibels of the ambient noise. If, as has been heretofore suggested, a bias voltage is produced which is linearly related to the ambient noise level and utilized to control the gain of a variable gain amplifier tube, it will be found that the above mentioned characteristic will not result. This is due to the fact that the output of a voltage amplifier of a conventional type is a logarithmic function of the applied D.-C. grid control bias. It is therefore the primary object of this invention to provide a noise operated automatic volume control in which the sound output of a loudspeaker is varied in direct proportion with respect to the variation of the sound level of ambient noise.

It is a further object of this invention to provide a noise operated automatic volume control in which the ambient noise is converted to a bias voltage which has a logarithmic relation to the noise level in order to compensate for normal logarithmic output of the variable gain amplifier used in the circuit which drives the loudspeakers.

It is a still further object of this invention to provide a thermionic amplifier in which the output level measured in decibels will be controlled so as to vary linearly with the variation in the ambient noise level.

It has further been determined that, should the noise level reach a very high value, it is undesirable to increase the output of the loudspeakers beyond a predetermined point, depending upon the acoustics of the room and other conditions. It is therefore a still further object of this invention to provide a noise operated automatic volume control in which the maximum sound output may be limited to a predetermined value.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a block diagram illustrating this invention, Figure 2 is a circuit diagram illustrating an embodiment of this invention, and Figure 3 is a series of curves showing the relationship between the noise input and the signal output of the system described.

Referring to Fig. 1, any suitable source of audio signal 1 which may be a voice-actuated microphone, radio set or phonograph reproducer, is connected to the input of a variable gain amplifier 3. The output of the variable gain amplifier is connected, if necessary, to an additional voltage amplifier 5 and then to a power amplifier 7, the output of which is utilized to energize one or more loudspeakers 9 in the conventional manner. Located in the same room with the loudspeakers 9 is a pickup microphone 11. In order to avoid undesired feedback between the loudspeakers and the microphone the latter is preferably mounted adjacent the primary source of noise, and may be provided with sound absorbing baffles 13 and 15 which are so positioned with respect to the microphone 11 as to substantially shield it from the direct radiations from the loudspeaker. The output of the microphone is applied to a logarithmic amplifier 17 and, if necessary, to a voltage amplifier 19, the output of which is applied to a rectifier 21. The rectified D.-C. output of rectifier 21 is the bias voltage which is applied to the variable gain amplifier 3. In addition a limiter 23 is connected in circuit with rectifier 21, in order to limit the amplitude of the D.-C. bias voltage to a predetermined value.

CROSS REFERENCE SEARCH ROOM

Figure 2:
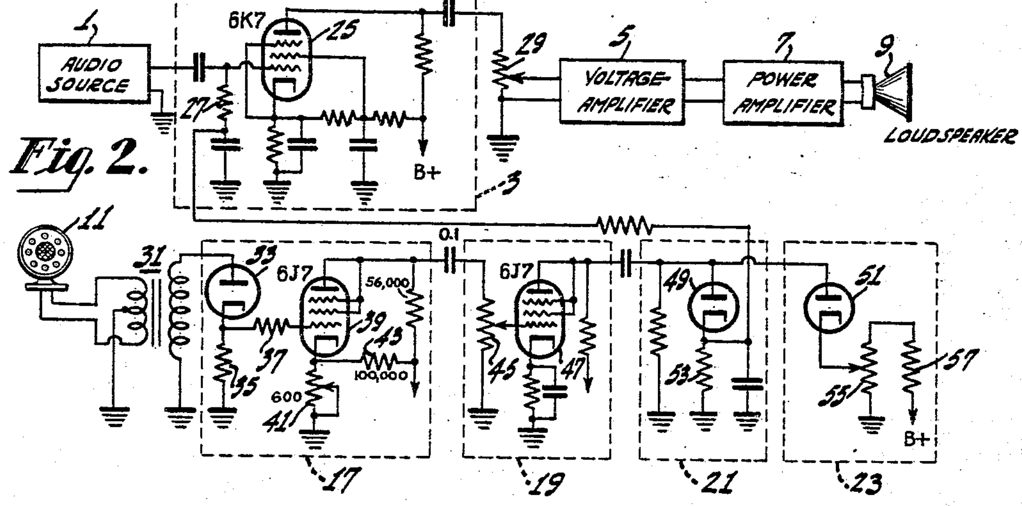
Figure 3:
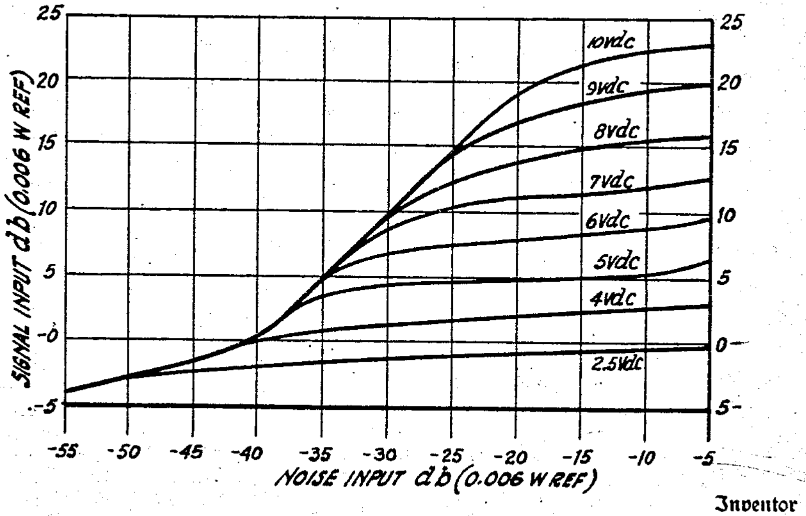

While many circuits may be employed to accomplish the functions indicated in Fig. 1, a preferred embodiment is shown in Fig. 2, to which reference is now made. The audio source 1 is coupled in the normal manner to the grid of a thermionic amplifier tube 25, which may be of the 6K7 type, the input circuit including a resistor 27 by-passed to ground in order to provide a complete circuit for the input audio voltage. The lower terminal of resistor 27 is connected to the bias control source 21 which will be described subsequently. The output of the amplifier tube 25 is coupled to a potentiometer gain control 29 which feeds the voltage amplifier 5 and in turn the power amplifier 7 to which the speakers 9 are connected.

The noise operated volume control circuit comprises the microphone 11 which is connected through an input transformer 31 to the anode electrode of a diode 33, the cathode of which is returned to ground through a resistor 35. The cathode of diode 33 is connected through a resistor 37 to the grid of an amplifier tube 39 which may be of the 6J7 type, for example. The cathode of amplifier tube 39 is connected to ground through a variable resistor 41 and to a suitable source of positive potential through a series resistor 43 of high resistance value. The output circuit of the amplifier is coupled to a potentiometer 45 and is provided with D.-C. plate potential in the conventional manner. A voltage amplifier tube 47 has its grid connected to potentiometer 45 and its plate coupled to the anode electrodes of two diode rectifiers 49 and 51. The former constitutes a rectifier for converting the A.-C. voltage representing the ambient noise into a D.-C. potential, the amplitude of which is logarithmically related to the noise level. This voltage is derived by a connection to the cathode of rectifier 49, the cathode also being connected to ground through a resistor 53. Rectifier 51 is the limiter, and its cathode is connected to the movable contact of a potentiometer 55, the resistance element of which is connected between ground and a suitable source of positive potential in series with a fixed resistor 57.

The circuit is first adjusted by setting cathode resistor 41 of the amplifier tube 39 to such a value that the effective grid voltage is approximately at the point where grid current just begins to flow. This adjustment is made in the absence of a noise input signal. The setting of this resistor controls the slope of the input-output curve. Increasing the positive cathode bias voltage increases the slope of the curve and decreasing the bias decreases the slope of the curve. The normal operating range is, for the type of tube indicated, between +.4 and +1.0 volts, which corresponds to a negative grid bias of the same range. The actual value required to cause the audio output level to be directly proportional to the noise input level can best be determined by making a performance test of the actual amplifier.

The purpose of rectifier 33, connected in the input circuit to the amplifier tube 39, is to remove the negative half of the applied noise-representing signal so that the tube operates only with a positive grid voltage. This assures that a small grid current flows in the tube at all times and, as a result, the plate current will have a logarithmic relationship to the amplitude of the noise signal applied by the microphone 11. Rectifier 33, amplifier tube 39 and the associated circuit elements together constitute a logarithmic amplifier.

The A.-C. noise-representing signal having a logarithmic relationship to the ambient noise, as described above, is then amplified by a conventional voltage amplifier tube 47 which needs no further description. This voltage is then rectified and filtered by the diode rectifier tube 49 to produce a D.-C. voltage whose amplitude is in turn a logarithmic function of the ambient noise level.

Since, as stated above, it is necessary to apply to the grid of the variable gain amplifier 3 a control bias which varies logarithmically with the ambient noise in order to cause the output of the loudspeader to vary linearly with respect to the noise level, the D.-C. voltage appearing across resistor 53, when applied to the control grid of tube 25, will produce the desired result.

In order to limit the maximum amplitude of the output the potentiometer 55 is adjusted so that a given positive potential is applied to the cathode of the rectifier 51. For low levels of input the plate of diode 51 will be less positive than this predetermined value and the tube will present a high impedance across the associated rectifier 49 and will not interfere with its operation. However, when the level of the control bias equals or exceeds this predetermined value, the limiting rectifier 51 will present a low impedance to the associated rectifier 49 and will effectively limit the bias voltage to any desired predetermined value.

Fig. 3 shows a series of performance curves in which the signal output, shown as the ordinate, is plotted against noise input, shown as the abscissa, buth input and output being measured in decibels, for various settings of the limiter, the curve for 2.5 volts D.-C. being the input vs. output characteristic of the apparatus when the positive bias applied to the limiting diode 51 has a value of 2.5 volts and limiting begins at a low output level. The other curves show the variation of signal output as a function of the noise input as the bias on the control diode 51 is varied through a number of values up to 10 v. D.-C. It can be observed that for the 10 volt curve, for example, the output is substantially linear and is directly proportional to the input between a region from −20 to −40 db. input. This is the normal operating range and it is therefore evident that the device operates in the required manner to vary the signal output as a linear function of the noise input.

I have thus described a noise operated automatic volume control which samples the ambient noise level in the vicinity of a loudspeaker and which varies the loudspeaker output automatically as a linear function of the noise level.

What I claim is:

1. In combination, a variable gain amplifier, a loudspeaker operated by the output of said amplifier, noise pickup means, means in circuit with said noise pickup means for producing a D.-C. bias voltage which varies as a logarithmic function of the output of said noise pickup means, and means for utilizing said bias voltage to vary the gain of said variable gain amplifier, thereby to vary the output power level of the loudspeaker as a linear function of the ambient noise level.

2. In combination, a source of audio frequency voltage, a variable gain amplifier having control grid and plate electrodes for amplifying said voltage, said amplifier having an output voltage characteristic which is a logarithmic function of an applied D.-C. biasing potential, a power amplifier coupled to said variable gain amplifier and including output means for producing an audio sound output corresponding to said audio frequency voltage, noise responsive means for producing an alternating voltage proportional to the amplitude of ambient noise in the vicinity of said sound output means, means for converting said alternating voltage into a D.-C. bias voltage which varies as a logarithmic function of said ambient noise level, and means for applying said bias voltage to said control grid to control the gain of said variable gain amplifier, thereby to vary the output power level of the sound output means as a linear function of the ambient noise level.

3. A device of the character described in claim 2 which includes means for limiting the maximum amplitude of said bias voltage.

4. In combination, a source of audio frequency voltage, a variable gain amplifier having control grid and plate electrodes for amplifying said voltage, said amplifier having an output voltage characteristic which is a logarithmic function of an applied D.-C. biasing potential, a power amplifier coupled to said variable gain amplifier and including output means for producing an audio sound output corresponding to said audio frequency voltage, noise responsive means for producing an alternating voltage proportional to the amplitude of ambient noise in the vicinity of said sound output means, means for rectifying said alternating voltage, a thermionic amplifier tube having input and output electrodes, means to bias said thermionic amplifier to the portion of its characteristic curve at which it has a logarithmic response means for applying said rectified alternating voltage to said input electrodes, a bias rectifier and a filter coupled to said output electrodes for producing a D.-C. bias voltage, said bias voltage varying as a logarithmic function of the amplitude of the ambient noise, and means for applying said bias voltage to the control grid of said variable gain amplifier, thereby to vary the output power level of the sound output means as a linear function of the ambient noise level.

5. A device of the character described in claim 4 which includes a second rectifier in parallel with said bias rectifier and means for applying a predetermined bias potential to said second rectifier, thereby to limit the amplitude of the biasing potential variation.

LOWELL H. GOOD.

REFERENCES CITED

The following references are of record in the file of this patent:

UNITED STATES PATENTS

| Number | Name | Date |
|---|---|---|
| 2,338,551 | Stanko | Jan. 4, 1944 |
| 2,382,848 | Baumgartner | Aug. 14, 1945 |
| 2,392,218 | Anderson | Jan. 1, 1946 |
| 2,409,977 | Fisher | Oct. 22, 1946 |
| 2,420,933 | Crawford et al. | May 20, 1947 |
| 2,449,971 | Andrews | Sept. 28, 1948 |